United States Patent [19]
Lantz et al.

[11] Patent Number: 4,890,833
[45] Date of Patent: Jan. 2, 1990

[54] APPARATUS FOR GENERATING ENHANCED INTERACTIVE VIDEO GAME PLAYFIELD ENVIRONMENTS

[75] Inventors: Kenneth F. Lantz; Scott C. Herschler, both of Chicago; Charles R. Bleich, Palatine; Walter E. Smolucha, Melrose Park; Gregory W. Wepner, Clarendon Hills, all of Ill.

[73] Assignee: Williams Electronics, Inc., Chicago, Ill.

[21] Appl. No.: 182,387

[22] Filed: Apr. 18, 1988

Related U.S. Application Data

[62] Division of Ser. No. 54,094, May 22, 1987, Pat. No. 4,766,541.

[51] Int. Cl.$^4$ .............................................. A63F 9/22
[52] U.S. Cl. .................................. 273/1 E; 273/85 G; 273/DIG. 28; 340/723
[58] Field of Search ............ 273/1 E, 85 G, DIG. 28; 340/720, 723-725

[56] References Cited

U.S. PATENT DOCUMENTS

| | | | |
|---|---|---|---|
| 4,475,132 | 10/1984 | Rodesch | 273/DIG. 28 |
| 4,580,782 | 4/1986 | Ochi | 273/DIG. 28 |
| 4,709,393 | 11/1987 | Taylor et al. | 382/41 |
| 4,766,581 | 8/1988 | Korn et al. | 340/706 |

Primary Examiner—Leo P. Picard
Attorney, Agent, or Firm—Rockey and Rifkin

[57] ABSTRACT

A video game or the like including a real-time interactive video disk game-play background generation system. The disk player incorporates track skipping capability which is under the direct control of the game processor, on a frame-by-frame basis, whereby substantially instantaneous jumps to alternative video scenes can be effected in response to changing game play. Video scene data is stored on the disk in horizontally compressed format. A video expander/scroller effectively stretches the compressed video from the disk by a factor of two and selects, under game processor control, one frame width, or one-half the expanded background scene, for display. A color programmable read-only-memory (PROM) having at least two pre-programmed color pallets is provided to redefine color relationships of game symbols stored in read-only-memory (ROM) thereby reducing the storage of redundant game symbol data in this ROM.

9 Claims, 2 Drawing Sheets

APPARATUS FOR GENERATING ENHANCED INTERACTIVE VIDEO GAME PLAYFIELD ENVIRONMENTS

This is a division, of application Ser. No. 054,094, filed May 22, 1987 now Pat. No. 4,766,541.

The present invention relates to an improved video game utilizing a laser video disk and, more particularly, to a video game having an integrated video disk system wherein access to the video picture data on the disk can be rapidly altered on a frame-by-frame basis to provide enhanced and realistic game play environments.

Conventional video games maintain a relatively limited number of images in a fixed medium such as a read-only memory (ROM) for subsequent manipulation in accordance with microprocessor controlled game play. Such game images typically include symbols representing the game 'player' as well as the player's numerous 'adversaries'. Due to practical restrictions on memory size and the limited speed with which blocks of memory can be repositioned, there exists a corresponding limitation on the number, size, and movement of these game symbols in games utilizing conventional symbol generation techniques. Similarly, the background or environment in which the game players and other objects move is significantly limited thereby precluding realistic game 'playfields' and 'interactive' backgrounds that change in direct response to player 'movement' therethrough.

The advent of video disk playback apparatus, with its substantial video data storage capability, has, in part, overcome this limitation. Video from the disk player may be added to the game play symbols, generated in conventional fashion, to create a detailed background scene or, alternatively, game play may be interrupted and a video disk segment representative of, for example, an explosion occasioned by the 'hitting' of an enemy target may be temporarily substituted therefor. Both approaches have been used in the Sega Astron Belt game. A similar arrangement is disclosed in Baer U.S. Pat. No. 4,359,223.

Although providing enhanced background imagery, these video disk arrangements do not permit instantaneous changes of the video disk background scene necessary to facilitate real-time interaction with game symbols and players. In such known systems, discrete segments of video disk material are played one at a time affording a predetermined, but, invariant sequence of background scenes during any given video segment. It will be appreciated that such a background segment necessarily runs its predetermined sequence and, therefore, the game background can not immediately respond to, nor reflect, changes signalled by player game play. In addition, movement or jumps from one video disk segment to another require substantial search time thereby causing distracting blank periods in the background scene as the video disk cues to the next video segment. Such time consuming segment searching precludes the rapid jumping between sequential video segments as required to generate an interactive background responsive to real-time game play.

Currently available laser video disk machines include a video track skipping capability in addition to the normal sequential forward playing of the video disk. It has been determined that these machines may be stepped as many as two hundred tracks in either the forward or reverse direction during the interval between successive video frames. The present invention relates to game processor interactive control of a video disk playback machine and, in particular, to the control of track skipping on a real time frame-by-frame basis whereby a wide range of forward and reverse, as well as stop action, speeds may be simulated. More significantly, the present controlled frame-by-frame track skipping permits the instantaneous real-time selection between a wide variety of video segments without time consuming and distracting search interruptions. In this manner, the video game of the present invention provides video disk generated background or scene material of high detail responsive in real-time to the changing game play.

It is therefore an object of the present invention to provide a game of high background detail and resolution; such background being stored on a video disk. It is a further object that the video disk shall be under the control of the game processor wherein the sequence of frames to be played can be varied on a frame-by-frame basis. In addition it is an object that the video disk shall be controllably incremented, either in the forward or reverse direction, in steps of from one to about 200 tracks to effect fast, slow, forward, reverse, and stop motion of the video images on the disk.

It is also an object that said video disk shall be controllable on a frame-by-frame basis whereby the background scene can be altered substantially instantaneously on a real-time basis in response to game play. A further object of the present invention is to provide frame expansion and scrolling means of the video background from the video disk further aiding the real-time motion of the background during game play.

DESCRIPTION OF THE PREFERRED EMBODIMENT

Figure 1:
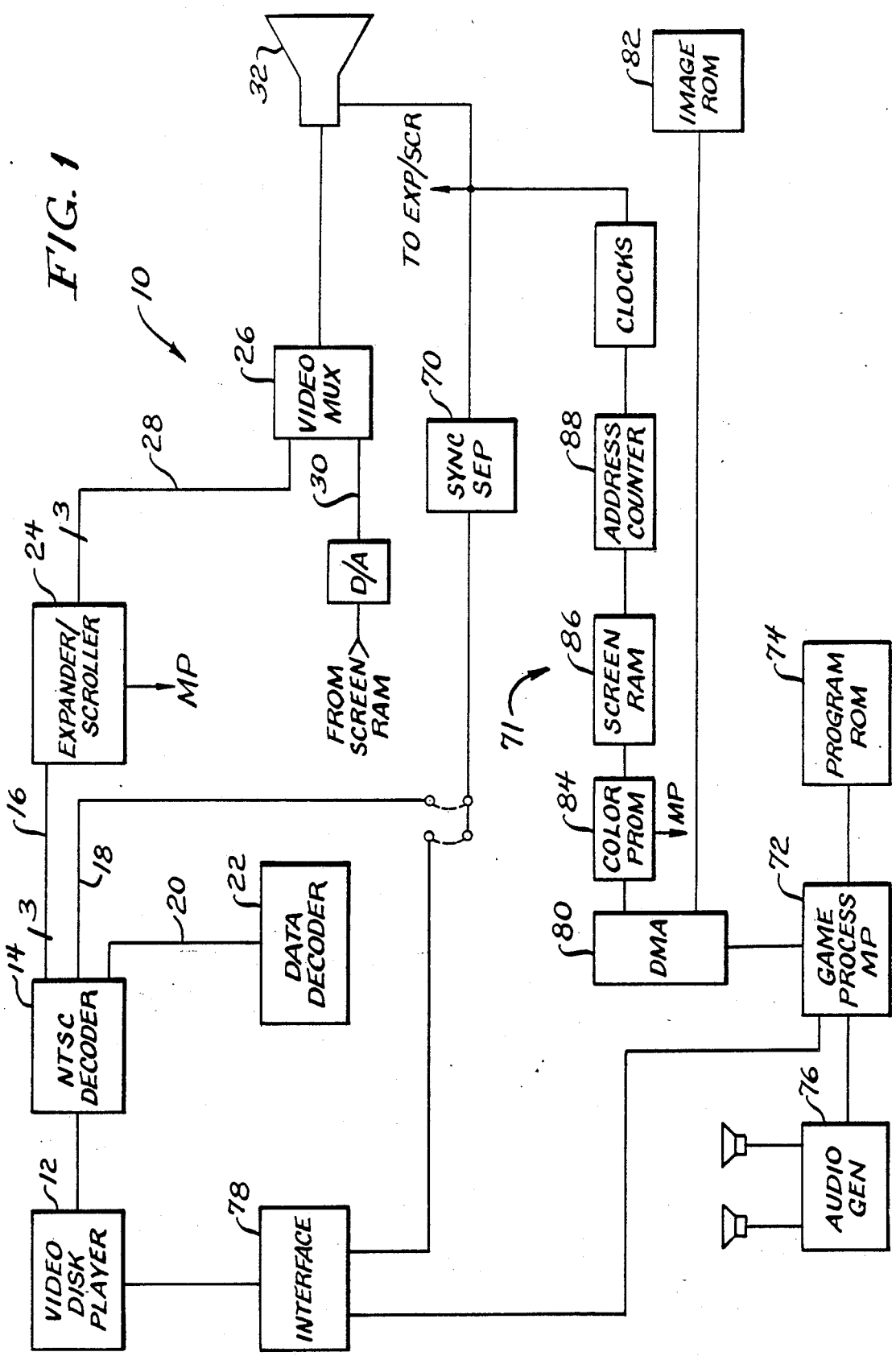
FIG. 1 is a block representation of the present video game including interactive video disk background scene generation, video expander/scroller, and game symbol color modifying RAM.

The video game employing the ineractive video disk background generation system of the present invention is shown as 10 in FIG. 1 and includes the video disk player 12. Disk player 12 utilizes a optical laser head to pick-off a composite video television signal, including sync and data signals, from the disk. Video picture data is retained digitally on the disk as a high frequency FM carrier. A conventional NTSC television format is employed although other color formats may also be used. The video signal is laid down on the disk, in the conventional circular manner, one complete picture frame per revolution or video 'track'. In this manner complete video frames may be skipped or repeated, as desired, simply by jumping radially along the disk between tracks. Two commercially available video laser players have been found satisfactory for use in the present invention. These are the Pioneer 8210 and the Philips VP 832; although larger jumps have been achieved with the latter player without objectionable intrusion into the next succeeding video frame. Other video disk players having track jump capability should also be suitable.

The NTSC color video signal from disk player 12 is processed by decoder 14 which serves to separate the color video into its three constituent primary colors 16 and to provide sync 18 and data 20 outputs. Frame number and segment identification data as well as other data necessary for game play may be stored in the horizontal or vertical interval on the video disk. Decoder 22 decodes this data for subsequent use by the game processor.

The decoded color signals 16 are processed through expander/scroller 24 and, in turn, passed to video multiplexer 26. Multiplexer 26 is comprised of three, two-input analog switches which alternately pass the expanded background video 28 or the game generated ROM symbols on lines 30 to the video CRT or monitor 32. In operation multiplexer 26 normally passes the background video from the disk to the monitor; switching to the processor video source 30 only when valid symbol is present for display.

Expander 24 operates, first, to multiply or stretch the width of each frame of video from the video disk by a factor of two and, second, to selectively convey one-half of the expanded frame to the video multiplexer. Scrolling is the process whereby, under game processor control, the desired segment of the expanded picture is selected and varied as required. In this manner an apparent lateral left/right movement with respect to the disk generated background can be achieved. It will be appreciated that the background video on the video disk must be stored in horizontally compressed format such that the expanded video will be displayed with the proper aspect ratio.

Figure 2:
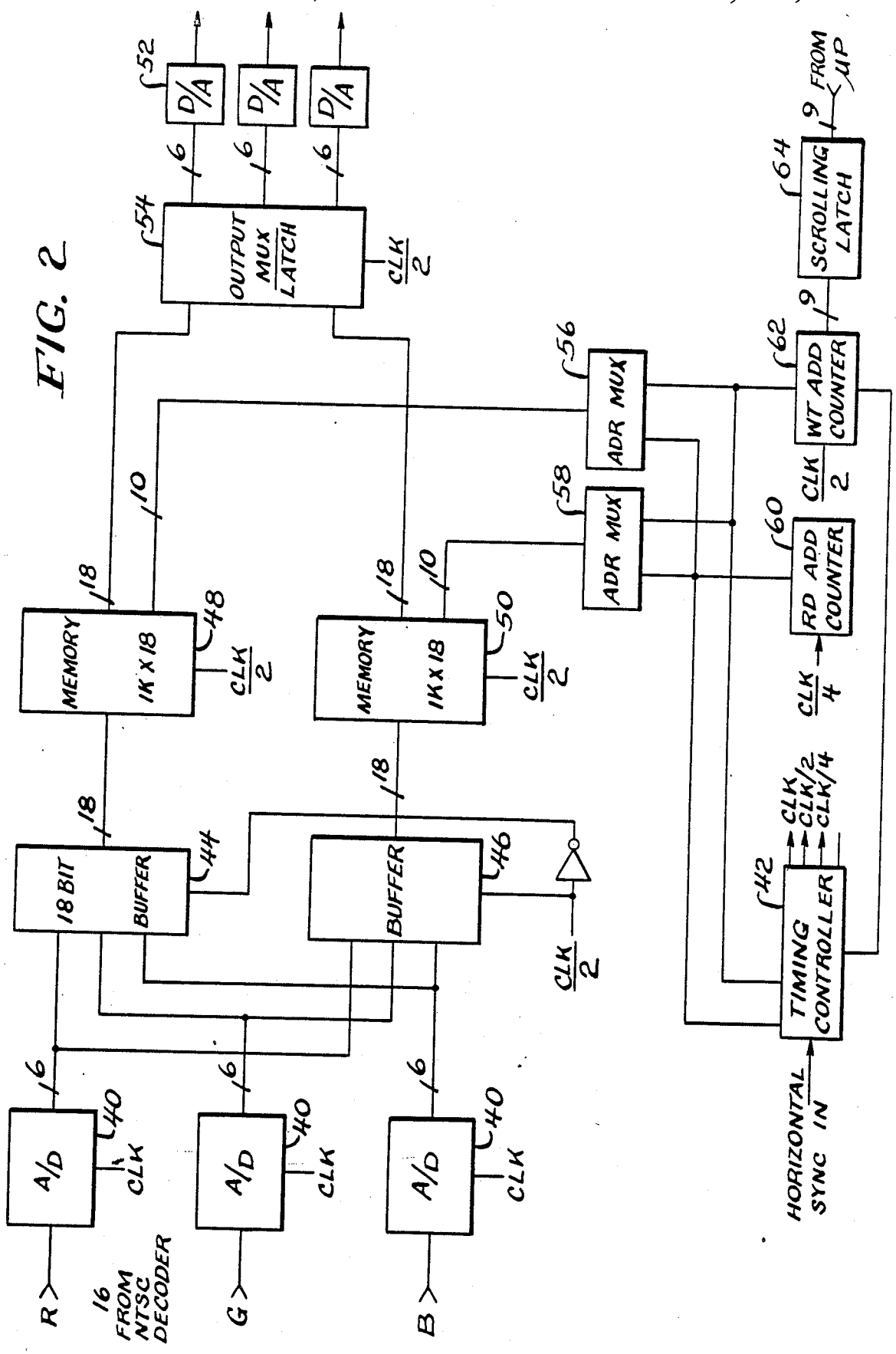
FIG. 2 is a block representation of the background scene generator expander/scroller.

Expander/scroller 24 is illustrated in greater detail in FIG. 2. Each of the three constitute analog color signals 16 from NTSC decoder 14 is applied to an analog-to-digital convertor 40 for subsequent high speed digital processing. Convertors 40 are operated at 24MHz from a clock signal generated by timing controller 42 and include a 6-bit output connected in parallel to two 18-bit buffers 44 and 46. Buffers 44 and 46 operate to alternately latch sequential 18-bit outputs of the three convertors 40. The use of alternating buffers 44 and 46 is necessary to achieve sufficient expander/scroller speeds necessary to process the video on a real-time basis. Buffers 44 and 46 are 35nSec NMOS devices operating at 12MHz from timing controller 42.

The data from buffers 44 and 46 are loaded into a pair of 1K×18 bit high speed memories 48 and 50, respectively. These memories store only two lines of video at a time and, consequently, expander/scroller 24 operates line-by-line on the video data from the disk. The portion of each line, as selected by the scrolling circuitry, is routed to the output digital-to-analog convertors 52 through a two input, 18-bit multiplexer/latch 54. Multiplexer 54 alternately selects data from memories 48 and 50 to reconstruct the serial video date stream.

Data is read from the memories and passed to analog convertors 52 at a 12MHz rate—one-half the rate at which the data is written into the memories from the disk. Expander operation is based upon this dual speed memory access principle wherein only one-half of each of the compressed video lines from the disk is passed to the video monitor during each horizontal scan. In this manner the video data comprising half of the original frame is stretched to fill the entire frame width of the monitor. Thus, one 18-bit byte is read from memories 48 and 50 for every two bytes written to these memories. This results in a memory read/write sequence as follows: read and write 48, read and write 50, write 48, write 50, and so forth.

Separate read/write address multiplexers 56 and 58 are provided for memories 48 and 50, respectively. Each address multiplexer is connected to read address counter 60 and write address counter 62 thereby alternately selecting read and write addresses as required by the memories. Write address counter 62 is incremented at a 12MHz rate while read address counter is clocked at one-half this rate, or 6MHz, by clock signals from timing controller 42. Scroller start address latch 64 is connected to the game processor and is preset to the desired frame start address by the game processor prior to commencement of any given video frame. This start address is retained in the scrolling address start latch 64 until reprogrammed by the game processor. Thus, during this interval, all subsequent video frames will commence from the same location in the expanded video frame.

In operation, expander/scroller 24 is synchronized by standard horizontal sync pulses present on the composite video from the disk player 12. This sync information is removed by a conventional sync separator 70 comprising a portion of the video graphics generator 71. Operation of A/D convertors 40 to 24 MHz enables digital samples to be taken approximately every 42 nanoseconds which corresponds to 1280 samples or pixels for each non-expanded video line from the video disk. Following expansion, in which one-half of the original line is time-stretched to fill the horizontal time interval originally occupied by the full non-expanded video line, 640 digital video samples, or pixels, remain. This permits the generation of high resolution expanded video game play scenes.

The horizontal sync pulse preceeding each horizontal scan resets the read address up-counter 60 to zero and presents the scroller start address from latch 64 into write address up-counter 62. Reading of the last-stored video line commences immediately with one pixel being read alternately from each of the memories 48 and 50 for every read address from counter 60. Read address counter 60 is incremented by a 6 MHz clock thereby reading pixels from the two memories at a 12 MHz rate, or 640 per line.

Incrementing of the write address counter 62 also commences immediately following each horizontal sync pulse. This counter is clocked at a 12 MHz rate. However, writing to memories 48 and 50 from the digital pixel data present at the outputs of buffers 44 and 46 is inhibited until the write address counter is incremented to zero. The compliment of the scroller start address is loaded by the game processor 72 into scroller latch 64 which, in turn, presets the write address up-counter. As is well known, this is equivalent to down-counting from the non-complement start address and results in the commencement of memory write operations at the prescribed start address.

It will be appreciated that by inhibiting writing in this manner, write address counter 62 doubles as a write delay timer. As only one-half of the original compressed video line from the disk is-expanded and conveyed to the motion; the remainder, or unused portion, of the original line need not be written into memory and, thereore, such loading is inhibited awaiting receipt of the first pixel defining the desired expanded portion of the line. It will be further appreciated that writing of data to memories 48 and 50 always commences at address zero (within a given memory block, as discussed below) due to the fact that writing is inhibited during the initial interval in which the counters are increment from the compliment of the start address to zero. Thus, each line to be expanded is retained in memory commencing at address zero thereby facilitating the subsequent reading of this line. As noted, the read address counter 60 is reset to zero following each horizontal sync pulse and, therefore reading necessarily commences from this zero address. Thus, it is also necessary to assure that each line is written to memory commencing at the zero address irrespective of the delay time or scrolling start address. The present arrangement, wherein write address counter 62 doubles as a delay timer, achieves this objective.

Timing controller 42 includes a block select flip-flop (not shown) which is toggled prior to the commencement of each scan line by the horizontal sync signal. Complimentary outputs from this flip-flop are added to the address outputs from the read and write address counters 60 and 62 thereby defining the most significant address bit from each of these counters, respectively. Thus, on alternate line scans two discrete blocks of memory are accessed during reading and writing to memories 48 and 50 as determined by the presence, or not, of the additional block select bit. Reading and writing always commences, as described above, from the zero address of the selected block whether block bit is 'set', or not. Since complimentary block select signals are combined to form the respective read and write addresses, reading and writing, during any given line scan, always occurs from different memory blocks. In this manner, the video line data written into memory during one scan sequence is read from memory during the next succeeding scan and so on.

Referring again to FIG. 1, game play is controlled by game processor 72 based upon the game program stored in read-only memory (ROM) 74. Processor input/output ports are provided for communication with a game sound system 76; expander/scroller 24; and disk player 12 through an independent microprocessor interface 78. In addition, the game processor can communicate with various elements of the video graphics generator 71, in particular, the direct memory access (DMA) circuit 80 and color PROM 84.

The graphics generator 71 comprises image memory (ROM) 82, color memory (PROM) 84, screen memory (RAM) 86, video address counter 88, clocks 90, in addition to the sync separator 70, video multiplexer 26, and DMA 80 previously considered. As previously indicated, there are two sources of video data, the video disk player 12 and the graphics generator 71, one of which is connected to CRT display 32 by operation of the video multiplexer 26. Both video sources output data on a continuous basis with selection of the 'live' source being determined, as explained in more detail below, by the nature of the data from the graphics generator.

The graphics generator, in part, utilizes known techniques for generation of a raster-scan video output from a computed generated digital image source. In this regard, a screen memory 86 for the storage of the game symbols to be manipulated by the game processor 72 and graphics generator 71 is provided. This screen memory space is arranged in the standard row/column format facilitating the sequential reading of memory rows in synchronization with the raster-scan of the monitor 32. Horizontal and vertical synchronizing signals, which originate from the video disk player, are utilized to synchronize the entire game including the expander/scroller 24, the CRT monitor 32, and the graphics generator. These signals are derived in conventional fashion by sync separator 70.

The video address counter 88, therefore, is comprised of separate line and column counters wherein, for each row addressed in sequence, the column counter is clocked through a series of sequential addresses representative of all columns defining the picture. Exemplary of such screen RAM video generation is the co-pending application of the present assignee, S.N. No. 462,080 filed 1/28/83; although other forms of symbol generation may be used with the present invention.

A variety of game symbols may be written to screen RAM 86 including symbols representative of the players, their adversaries, as well as obstacles, projectiles, and like objects. These game symbols are retained in a permanent (ROM) image memory 82 which, depending upon the game, may be in excess of 800K bytes in size. As is customary during game play, these symbols are frequently moved within, added to, or delted from, the screen of the CRT display 32. These 'movements' of game symbols are accompanied by corresponding manipulations of the symbol in screen RAM 86.

Manipulation of game symbols is under the indirect control of game processor 72 which loads instructions into the graphics generator 71 which, thereafter effects the desired operation or transfer of symbol data within, and between, image ROM 82 and screen RAM 86. Once programmed, the DMA 80 and graphics generator function independently of the processor thereby freeing the processor and its respective data and address buses for supervisory and other game play manipulations including, importantly, the interactive control of disk player 12 in response to game play. Detailed operation of DMA 80 is described in the above referenced co-pending application, S.N. No. 462,080. Alternative forms of processor manipulation of game symbols may be employed including direct control over such transfers by the game processor or the inclusion of an additional processor dedicated to image memory transfers. The DMA and dedicated processor approaches are preferred for complex games having many and large symbols requiring frequent manipultions. Otherwise, a high speed game processor may be sufficient.

A significant feature of the present graphics generator is color PROM 84. Color PROM 84 is pre-programmed to define two or more pallets each comprised of 16 discrete colors assigned to each of the unique 4-bit pixel codes from the DMA. The various color pallets of PROM 84 may be advantageously selected by game processor 72 at any time during game play to facilitate symbol modification, as described more fully below, and thereby to avoid the necessity of storing redundant symbol data in image ROM 82. Alternatively, a color RAM, reprogrammable by the game processor, may be used. In this manner an image ROM memory of substantially reduced size may be employed.

Color RAMs interposed between the screen memory and the video display monitor are well known in the game art. Such RAMs, however, generally define the overall color relationships across the entire screen of frame and are wholly unsuited for use in altering the color scheme of a limited region of the screen or a single game symbol. This is due to the necessity, inherent in these prior art structures, of alternately reprogramming the color RAM on a line-by-line basis during each raster-scan frame. This places undue speed requirements on the color RAM and unduly ties-up the processor.

The present arrangement, by contrast, manipulates the color data prior to storage in the screen RAM 86 thereby avoiding the necessity of redefining the color scheme on each successive scan sequence. Once defined and written to memory, the picture data may be scanned indefinitely without further action by the game processor or color PROM/RAM. Importantly, the successive and frequent reprogramming of the color RAM required by the prior art is completely avoided as the DMA functions to modify the screen memory a symbol at a time. Thus, the appropriate pallet of color PROM 84 defining the desired color relationship is selected by the game processor prior to commencement of symbol manipulation and need not be updated again, if at all, until the next memory block operation.

The savings of image ROM memory space available with the present color PROM arrangement is achieved, in part, by selectively controlling the operation of the video multiplexer and, specifically, by altering the respective proportions of time that the disk and screen RAM video signals are gated to the monitor 32 for any given symbol under consideration. As previously discussed, multiplexer 26 alternatively selects the video from either the screen RAM (video graphics generator) or the disk player 12. In general, the video disk is selected unless symbol data is being outputed by the graphics generator. Since the screen RAM is providing a constant stream of data; the presence of legitimate symbol data is determined by defining a 'background' color, conveniently binary '0000', and by setting all non-symbol screen RAM memory space to that background color. Thus the presence of a non-zero data byte from the screen RAM implies a legitimate symbol byte which is gated, by multiplexer 26, to the monitor. Conversely, whenever zero-valued data is received from the graphics generator, multiplexer 26 automatically switches to the disk player and forwards this source of video to the monitor.

It will be appreciated that color PROM 84, in conjunction with a video game having an alternative or background source of video, provides a heretofore unknown means for modifying image ROM data thereby avoiding the necessity of storing multiple highly redundant symbol images in ROM. Using color PROM 84 to selectively redefine the 'background' regions of any given symbol in ROM 82, a plurality of permutations of that symbol may be created. The primary symbol image is retained in ROM with certain predetermined regions of the image being defined, each by discrete known colors. One or more of these symbol regions may be effectively deleted by color PROM 84 simply by selecting a different PROM pallet thereby setting the respective colors to 'zero' when written to the screen RAM 86. In this manner, numerous images may be derived from a single color coded symbol thereby eliminating significant ROM image space which would otherwise be required to separately store each of these images.

Interactive video disk game play is achieved by game processor 72 control of disk player 12 through interface 78 and, more specifically, by selectable skipping of video tracks on the disk. Although substantially unmodified off-the-shelf video players are contemplated for use with the present invention; only video disk players having track skipping capability are suitable for use herein. Conventional disk searching is too slow to permit the nearly instantaneous interframe jumps required for flexible operation of the present invention.

As previously discussed, each frame of video defines a single complete 'track' on the video disk and, therefore, it is merely necessary to incrementally displace the playback head radially across the tracks in order to achieve video still-frame or frame skipping, in either the forward or reverse direction. Track jumping is under the control of game processor 72 which, in response to game play, outputs commands to the disk apparatus, through interface 78, representative of the direction and number of tracks to be jumped. Inherent constraints in the mechanical arrangement of the disk playback head (principally the mass of the head and its associated hardware) limit the maximum number of tracks that may be jumped in the vertical interval between sequential frames without undue time encroachment into the video portion of the next frame. It was determined that the Philips VP 832 disk player could be stepped about 200 tracks as compared with the Pioneer 8210 player's 5 to 6 track limit.

A microprocessor based interface 78 is provided to control the video player track skipping in accordance with instructions received from the main game processor 72. Interface 78 contains conventional circuitry including, in addition to the processor, a program memory (ROM), a random-access-memory (RAM), and peripheral interface adaptors (PIA) operatively interconnected to the game processor and disk player. Specific programming and operation of interface 78 is determined by the particular video disk player employed.

Proper interfacing and control of the Pioneer 8210 video disk player requires that various TTL compatible internal control functions be made available to interface 78. These include the scan "C" and jump trigger functions. Scan "C" controls the direction of the jump while a pulse on the jump trigger line causes the player to jump forwardly or rearwardly one track according to the scan "C" signal.

Internally, the jump trigger signal generates an impulse of preset magnitude which is utilized to bounce or jog the laser mirror approximately one track. Thereafter, the internal track-centering feedback circuitry maintains the laser playback head properly centered in the groove until the next track-skipping pulse is received. It has been determined that a jump trigger repetition rate of approximately 350 microseconds (pulse width of approximately 50 microseconds) provides proper settling of the laser head in a destination track thereby assuring accurate multi-track skipping in response to a predetermined number of sequential pulses from interface 78. At this repetition rate, a maximum of six tracks may be skipped during a single vertical interval without undue encroachment into the video picture signal.

The processor of interface 78 may advantageously by used to perform certain computations relating to the track skipping function. For example, to control the apparent velocity of game player travel through the video disk generated background, the main game processor 72 merely instructs interface 78 regarding the desired speed, or the ratio of desired speed to normal play speed. Thereafter, the interface processor calculates the actual sequence of frames and outputs the corresponding pulses required to produce the desired motion.

The Philips VP 832 disk player, in contrast, incorporates a built-in 8-bit parallel interface of conventional industrial protocall through which the disk player may be controlled. Available input commands include GO TO FRAME No. xxx and PLAY; GO TO FRAME No. xxx and HALT; HALT; PLAY REVERSE; SLOW FORWARD AT SPEED xxx; SLOW REVERSE AT SPEED xxx; SCAN FORWARD X 75;

SCAN REVERSE X 75; JUMP IMMEDIATE FORWARD xxx TRACKS; and JUMP IMMEDIATE REVERSE xxx TRACKS. It is the latter two JUMP IMMEDIATE commands which are utilized with the present invention. The GO TO commands are conventional search routines requiring, as previously indicated, more time than allotted within the available vertical interval.

Unlike the Pioneer counterpart, the Philips VP 832 internally generates the necessary mirror incrementing pulses in accordance with the number of tracks specified in the JUMP IMMEDIATE instruction. Each instruction is comprised of three 8-bit bytes including a byte indicating the number of tracks to be jumped. As many as 200 tracks may be jumped in a single vertical interval with the Philips player. For jumps of about 8 tracks or less, the Philips player operates substantially the same as the Pioneer player by internally generating a series of jump pulses and locking in each track as the laser mirror is bumped to successive tracks. However, for jumps in excess of about 8 tracks, advancement by incrementing the mirror one track at a time is discontinued and, instead, the playback head is set in motion with internal track detection circuitry registering the number of tracks passed. As the head nears the predetermined track count, head movement is slowed and stopped.

Operation of interface 78 with the Philips VP 832 is similar to that discussed above with reference to the Pioneer 8210 player except that the interface outputs various 8-bit control bytes dictating the number of tracks to be skipped rather than the corresponding sequence of uniformly spaced track skipping pulses. Otherwise, interface 78 identically receives instructions from game processor 72 and calculates the required track jump sequences or instructions therefrom.

Interactive processor controlled frame skipping of the present invention offers significant game play advantages not heretofore possible, with or without the addition of a video disk source. Foremost is the present capability of generating a detailed full screen background which is immediately responsive to player or processor directed game play. In this manner a highly realistic real-time first person movement of the player or his symbols can be achieved in an authentic or detailed surrealistic background environment. Known prior art systems, even those utilizing video disk sources, generally lack a realism of motion due either to the limited detail of the background scene or the relatively limited or slow movement of the scene itself.

The frame-by-frame track skipping control of the present video game facilitates substantially instantaneous changes in either the velocity of 'player' movement through the environment or, importantly, the path of travel therethrough. Speed control, for instance, may be controlled by selectively and periodically jumping the disk player to effectively control the rate at which frames are played back. Thus, the standard non-skipping frame rate of 30 frames-per-second may be set, for example, to represent travel through the background environment at 60 MPH. Playing each frame twice, i.e. by skipping back one fame every other frame, travel is slowed to just 30 MPH while skipping ahead every other frame increases the apparent speed to 90 MPH. Virtually continuous speed control from zero, i.e. still-frame, on up can be achieved by appropriately varying the effective rate of frame advance in this manner.

Of particular additional signficance is the capability of the present arrangement to instaneously transition between various alternative video segments or sequences in response to processor or player initiated game play. Known video disk system with their inherently restricted segment search disk player control can not respond in real-time to changing game play movement with respect to the background environment. Once established within a given video disk segment, these prior art games play the entirety of that segment and, in any event, the relatively lengthly time required to search for an alternative segment results in unrealistic and unacceptable gaps in the video background presentation.

By contrast, the present controller permits alternative background environment segments to be conveniently stored in alternating sequences of 'mini-blocks'. One such example is a road-rally type game wherein the player, i.e. the driver, reaches an intersection having three possible courses of action: to go straight, to turn right, or to turn left. Any of these possible sequences may be selected by the player and, since it cannot be known until the player reaches the intersection which route will be selected, each is stored on the video disk in a series of mini-blocks instantaneously accessible upon proper game processor command. One possible arrangement of these sequences would be ten frames of left-turn followed by ten frames of straight followed by ten frames of right-turn—this sequence being repeated along the disk for the desired time duration.

If the player, upon reaching the intersection, proceeds to turn left; the disk apparatus will read the first ten tracks then, upon processor command, jump 20 tracks skipping the intervening straight and right-turn segments and continue with the second 10 left-turn tracks. This play and skip may be repeated as often as required to complete the left-hand turn segment of game play. Any length 'mini-block' may be selected consistent with the maximum jump capability of the disk player. Thus, in the example just presented, 20 track jumps were required to interconnect the related mini-block of any given sequence. Where the Philips disk player is used, the maximum length of each of the above mini-block would be 100 frames—resulting in a 200 track jump between sequential mini-blocks. It will be appreciated that by selecting larger mini-block sizes, less editing is required to generate the overall game disk video and, for this reason, larger mini-block sizes are preferred. On the other hand, the smaller the mini-block size, the greater the number of independent paths or video sequences which may chosen. With a maximum track jump of 200, up to 200 video sequences can be obtained; each sequence comprised of one frame mini-blocks with 200 track jumps between each displayed frame.

What is claimed is:

1. In a video display system having a raster scan display monitor, a processor, means for generating a raster scan video signal for display on the monitor, the raster scan video signal comprised of a plurality of video scan lines, means for expanding each scan line and for transmitting only a portion of such expanded scan line to the display monitor.

2. The system of claim 1 including scrolling means for selecting the portion of said expanded scan line to be displayed on said display monitor, whereby apparent motion with respect to the video picture is obtained by changing the relative location of said displayed portion.

3. The system of claim 1 wherein the expanding means includes read/write memory means for storing at least selected portions of the video signal from the generating means and for outputting said selected portions to the video monitor; means for periodically sampling the video signal from the generating means, first clock means for writing the video signal samples into the read/write memory means, second clock means for reading the video samples from memory, the frequency of the first clock means being greater than the frequency of the second clock means whereby only a portion of each video scan line from the generating means is read to the raster scan monitor during each scan of the monitor.

4. The system of claim 1 wherein the expanding means includes first and second read/write memory means each for storing a selected portion of a video scan line, means for alternately writing the selected portion of sequential scan lines to the first and second memory means, means for alternately reading the selected portion of the video scan lines stored in the first and second memory means to the display monitor, the means for reading and writing being synchronized such that writing to the first and second memory means occurs during reading of the second and first memory means respectively.

5. The system of claim 4 wherein the means for reading the video scan lines stored in the memory means to the video monitor occurs at a rate slower than the corresponding writing of the video scan lines into the memory thereby resulting in the video picture from the video generator means being displayed on the monitor in an expanded form with respect to the axis of the scan lines.

6. The system of claim 4 wherein the means for reading the video scan lines stored in the memory means to the video monitor occurs at a rate greater than the corresponding writing of the video scan lines into the memory thereby resulting in the video picture from the video generator means being displayed on the monitor in a compressed form with respect to the axis of the scan lines.

7. The system of claim 4 or 5 including a scrolling means for selecting said portion of the video scan lines to be stored in the memory means and displayed on the monitor means.

8. The system of claim 7 including a read address counter and a write address counter operatively connected to the memory means whereby each scan line is defined by a plurality of video picture elements stored in sequential addresses of the memory means.

9. The video game of claim 8 including scrolling start address latch operatively connected to the game processor and to the write address counter, the scrolling start address being preset into the write address counter at the beginning of each scan line; write inhibit means operatively connected to the write address counter, writing from the video generator means to the memory means being inhibited until the write address counter reaches the zero state thereby defining the start address of said selected portion of the video scan line from the video generator means.

* * * * *